Figure 1:
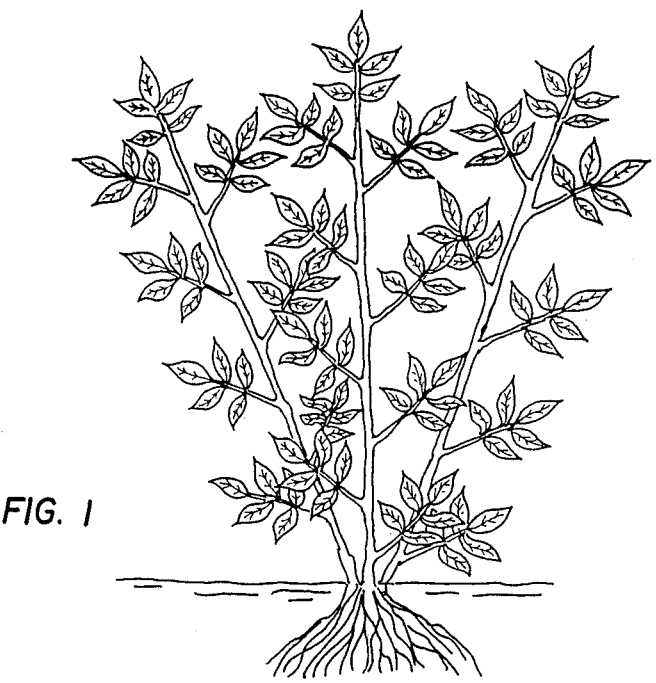
Figure 2:
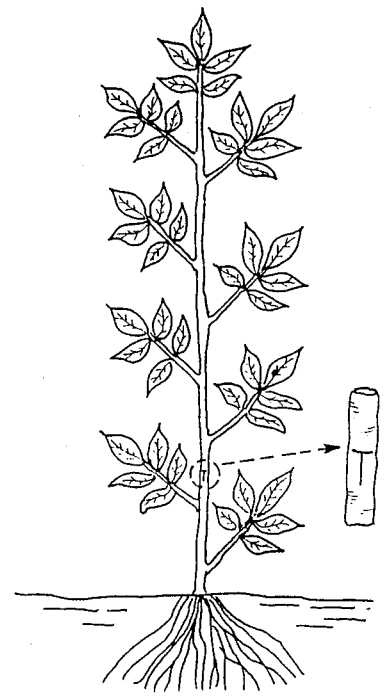
Figure 3:
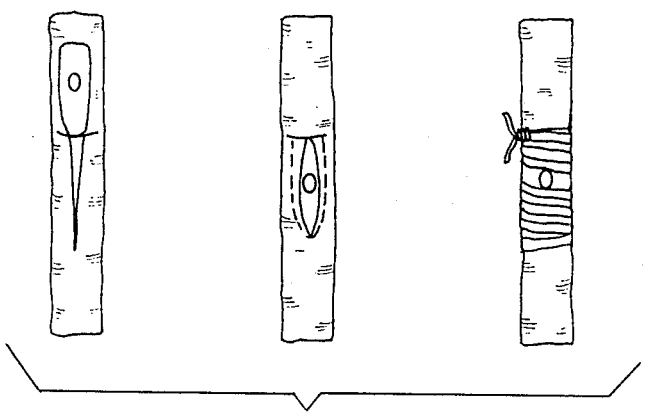
Figure 4:
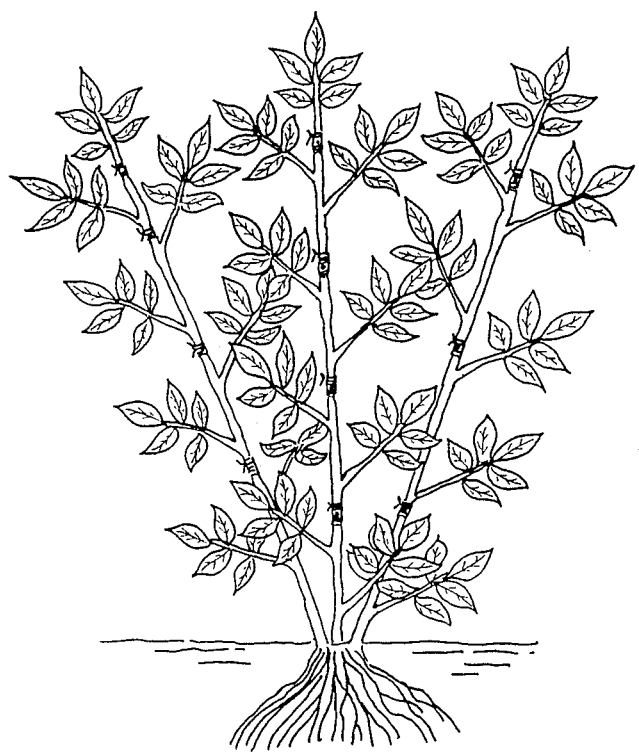
Figure 5:
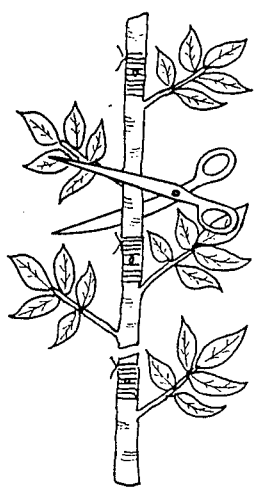

United States Patent [19]

Patrucco

[11] Patent Number: 4,944,115

[45] Date of Patent: Jul. 31, 1990

[54] PROCESS FOR THE MULTIPLICATION OF PLANT VARIETIES AND PRODUCTS OBTAINED THEREBY

[75] Inventor: Sergio Patrucco, Diano San Pietro, Italy

[73] Assignee: 501 Patrucco Due Co. S.R.L., S.N., San Peitro, Italy

[21] Appl. No.: 230,772

[22] Filed: Aug. 10, 1988

[30] Foreign Application Priority Data

Aug. 10, 1987 [IT] Italy ................................ 48286 A/87

[51] Int. Cl.$^5$ .............................................. A01G 1/00
[52] U.S. Cl. ..................................... 47/7; 47/DIG. 3
[58] Field of Search ........................... 47/6, 7, DIG. 3

[56] References Cited

U.S. PATENT DOCUMENTS

| 90,548 | 5/1869 | Hutchinson | 47/6 |
| 2,059,812 | 11/1936 | Scaglione . | |
| 2,764,844 | 10/1956 | Young | 47/6 |
| 3,012,372 | 12/1961 | Hechinger | 47/6 |
| 3,052,062 | 9/1962 | Boyle | 47/6 |
| 3,574,970 | 4/1971 | Geytenbeek | 47/7 |
| 4,154,020 | 5/1979 | Paz | 47/6 |

FOREIGN PATENT DOCUMENTS

| 563237 | 11/1923 | France | 47/6 |
| 2388485 | 11/1978 | France . | |
| 2482414 | 11/1981 | France . | |

*Primary Examiner*—Henry E. Raduazo
*Attorney, Agent, or Firm*—Browdy & Neimark

[57] ABSTRACT

A process for the multiplication of plant varieties which comprises the following operations: grafting of the variety to be reproduced on the tendril of a mother plant at various levels; production of cuttings of said grafted tendril, and rooting of said grafted cuttings of tendril. The process allows in particular the complete "rooting" of the graft (100%), the dematerialization of the product, the intensification of the density of cultivation. It also gives a high speed of multiplication and a prolonged biological and structural preservation. The invention also includes the product obtained through the process.

12 Claims, 3 Drawing Sheets

PROCESS FOR THE MULTIPLICATION OF PLANT VARIETIES AND PRODUCTS OBTAINED THEREBY

The present invention relates to a process for the multiplication of plant varieties and the products obtained thereby.

The development and consolidation of the welfare in our society are largely founded on the technological capability of man to multiply those plants which give food, building materials, and aesthetical pleasure in the case of ornamental plants.

Many plants of vital importance for our lives would become extinct without the work of man. The efforts of geneticists and bio-engineers, whose aim is to produce new improved forms of plant through genetic manipulation, would be of little importance for mankind without the contribution of the breeders; their field of work is the creation, the spread and selection of new plant varieties.

The necessity of developing a particular multiplication technique applied to plant varieties in order to strengthen the capacity of the nursery sector is derived from the above referred principle. The result is a completely new process of multiplication.

Below are listed the most important known techniques of "agamic or vegetative reproduction":
multiplication: by germs, stolons, root-suckers;
propagation: simple, layer of stem, multiple, aerial;
separation: of bulbs;
division: rhizomes, tubers, tufts;
multiplication: by branch cutting, by leaf cutting; woody, herbaceous, shoot, half-woody cutting;
grafting on the root: double tounge grafting;
grafting on the foot: double tounge grafting;
grafting on foliage: cleft grafting, double tounge grafting;
budding: ring grafting, I-grafting, "maiorchina" grafting. Of course, various other cleft graftings, not listed, can be suitably used.

In all the above mentioned cases the rootstock of the new plant to be reproduced must however be released from the ground, even though in different ways (e.g. layer).

The present invention mainly relates to budding or cleft grafting which are the most used in the practise because they are quicker than other graftings and, as a consequence, more economical.

It is widely known that a rose variety has to be grafted to a vigorous rootstock which gives strength and pedoclimatic adaptation capacities and phytosanitary resistance to said variety.

The process of multiplication according to the present invention will be described by way of example using the rootstock "Indica Major" and performing budding. It goes without saying that the process according to the present invention can also be used with other rootstocks specific for roses or other varieties and also in the case of other types of grafting.

The process according to the present invention radically changes the various working steps of the multiplication methods belonging to the state of the art.

According to the state of the art a method of agamic or vegetative multiplication is made up of three steps:
step 1: a cutting of rootstock *Indica Major* (25–30 cm) is taken from the mother plant;
step 2: the cutting is rooted, planting it in position and with a density which allow, at a later stage, all the necessary operations, first of all, to give the worker the possibility of carrying out grafting;
step 3: the variety to be reproduced is grafted when the rootstock is on sap, that is, when it "gives the rind".

According to the present invention, said step 3 of the method belonging to the prior art becomes the first operation, said step 1 becomes the second operation, and said step 2 becomes the third operation.

The process of agamic or vegetative multiplication according to the present invention is thus characterized by the fact that it includes one after the other the following operations:

(a) grafting of the variety to be reproduced at various levels on a tendril of the mother plant; (b) production of cuttings of said tendril grafted according to operation (a); and (c) rooting of said portions of tendril.

The different succession of steps of the two processes can be summarized as follows:
method belonging to the state of the art: production of cuttings of the woody rootstock; rooting of the rootstock; grafting;
process according to present invention: grafting on the tender rootstock; preparation of cuttings; rooting.

Figure 7:
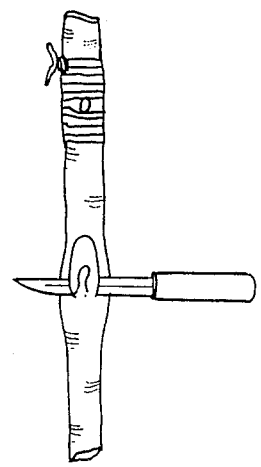
Figure 6:
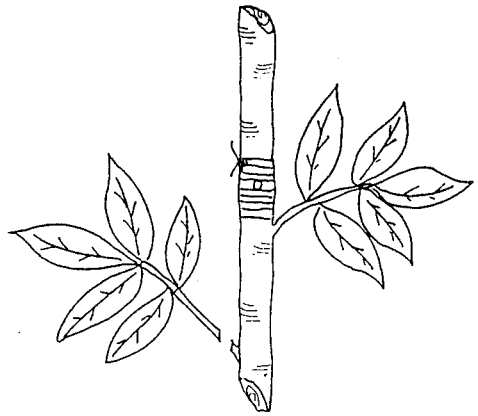
Figure 8:
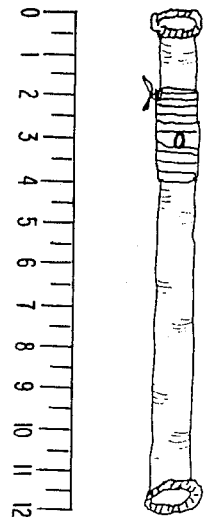

Characteristics and advantages of the present invention will be more evident from the following description of an example of embodiment thereof, with reference to the enclosed drawings, in which:

FIGS. 1 to 8 represent in a schematical manner elements and steps of the process according to the present invention. The method of operation is substantially the following:

(1) inoculations of buds to be grown at distances of about 12 cm from the base to the upper part of the tendril up to a diameter of about 5 mm of the same tendril (FIG. 2) are performed on the tender tendrils in the vegetation of mother plants (FIG. 1) of *Indica Major* grown in the open or in hot or cold houses (three harvests a year can be obtained);

(2) after the joining of the bud to the rootstock has taken place (about 21 days) (FIGS. 3, 4) the production of cuttings takes place (FIG. 5); in this case a bud of the rootstock can either be left above the inoculation or not;

(3) at this stage the cutting can either be kept, or not, before starting the rooting following the teaching of the process according to the present invention; in this case it is good practise to strip the leaves off and to strip the buds off from the cutting and eventually to cut the base of the same cutting to make its rooting easier (FIGS. 6, 7 and 8).

The positive outcome of the process according to the present invention is based on the observation (deriving both from experience and theory) that in the budding the plant must be in active growth, with the cortex (bark) leaving the wood, or "giving the rind"; in fact the inoculation according to the present invention is carried out when the tendril is very tender (reddish thorns) and moreover the plant has not undergone any vegetative stasis. This is impossible in all the other methods known in the art which follow the sequence: production of cutting of rootstock/rooting/grafting.

It frequently happens in the methods known in the art that the rootstock and/or the graft are too woody (black thorns) and in this case the formation of the healing callus of the grafting is slow, even if the plant is on sap, forming a joining node, with mixing of abnormal xylem and phellogenic tissues, which prevents the good flow of the sap from the rootstock to the new variety. In this respect it is to be considered that during the grafting neither a cell fusion or cell content fusion takes place; the joining of the grafting takes place with formation of a callus which is helped by the lymphatic activity of the rootstock.

The process according to the present invention discloses the teaching of using tender rootstocks carrying out the T-cut on the rootstock and opening the edges of the same rootstock to house the tissue of the fresh graft (budding). In this way the superficial layers of the cell of the cambium region both of the cutting and of the rootstock are put into intimate contact. The incisions activate the lymphatic flow and in about 72 hours the terminal cells of the interrupted medullary rays and the cells grown by the cambium of the rootstock provoke the production of callus and the same happens for the phloematic tissues.

In the grafting, after 10–12 days the existing space between the rootstock and inserted budding is completely joined by the callus which has developed, particularly owing to the prolification of the secondary of the rootstock and of the secondary phloem of the budding. After about 20 days, according to the pedoclimatic conditions and to dampness/temperature/light etc., the cambium tissue joins and the continuity of vascular tissues between the rootstock and the bud is established.

As already stated, following the process of multiplication according to the present invention in view of the fact that tender tendrils are used, the joining of the grafting is much easier and surer.

The main advantages of the present invention in comparison with the methods of multiplication belonging to the state of the art are the following:

(1) almost complete "rooting" of the graft, in view of the fact that the rootstock mother plant has a strong sap potential, showing a well-balanced radical/aereal ratio, unlike the rooted cutting;

(2) dematerialization of the product obtained particularly when considering storage and transport; the plant thus obtained, not only is 10–12 cm long, but has no roots, being however already grafted and ready for transplanting in greenhouses or in the open air. A 100×40×30 cm box can contain 5000 plants to be rooted, produced according to the process of the present invention, instead of the 300 rooted plants obtained according to known methods. In other words dematerialized grafted cuttings are obtained which are very strong and suitable for long-distance transportation without particular precautions being taken. This is due to the fact that the bud is an integral part of the grafting, unlike the grafting used in the processes known in the art;

(3) intensification of the cultivation density;

(a) in nurseries in the open according to the known methods, from 7 to 13 plants/m$^2$ can be planted (this density is due to the fact that the operator must have enough room to carry out the grafting); following the process of the present invention the density can reach 50 plants/m$^2$ in view of the fact that the grafting has already been carried out;

(b) cultivation under glass in containers elevated from the soil; there is no possibility of using the known methods because they are not economically advantageous in view of the poor density which can be reached; according to the present invention a cultivation density (rooting phase) of from 200 to 500 plants/m$^2$ can be reached, according to the kind of plant required;

(4) new possibilities of performing the rooting of the grafted cutting: it is possible to carry out the cultivation in phytocells/rock wool cubes/automatically operated containers. The rooting and the production of a chrysanthemum, pelargonium or carnation cutting can already be automatically performed because the grafting operation does not have to be carried out. On the contrary in the case of a rose or in the case of all plants requiring grafting to be multiplied, the methods known in the art were not suitable for carrying out an intensive, and at the same time economical, cultivation. This is due to the sequence of operating steps: production of cutting of the rootstock, rooting and putting on sap of the plant, grafting. Following the process of the present invention the first operation is the grafting and the second is the production of already grafted cuttings. In this way cuttings without roots are obtained and the operator can choose where and how to root the cuttings;

(5) speed of multiplication: according to the present invention the safe joining of the graft needs about 3 weeks, while the rooting of the grafted cutting thus obtained needs 4 weeks; that is to say in seven weeks the product is ready for marketing, whereas following the methods known in the art a rose is ready for marketing after a period varying from 9 to 18 months;

(6) biological and structural preservation: according to the present invention, after grafting it is possible to wait up to 10 months, if necessary, before carrying out the production of grafted cuttings; during this period the same rootstock lives together with the graft in the open air or under glass without the necessity of structures for its preservation. After this period it is still possible for another 6–10 months to keep on the preservation of the cuttings already grafted at (+0,5/+0,1° C. in a refrigerator) without the necessity of waxing and without harm to the products. This means that the preservation period with biological safety is 600 days and this gives new possibilities, that is:

(7) rooting possibilities:

(a) possibility of rooting the cuttings in programmed periods on containers elevated from the soil under the effect of heat with Mist or other systems;

(b) possibility of rooting the cuttings at great distances, in view of the fact that the dematerialization of the product allows economical long-distance transportation; for instance, according to the present invention it is possible to graft and to produce the cuttings on mother plants in Sicily and have them root in Denmark under glass, where, owing to the cold climate, it is well known that *Indica Major* cannot be cultivated.

(8) more vigorous growth: greater emission of root-suckers of the variety.

It is to be noted that the process according to the present invention can be performed for the whole year with a logical and rational technique. It is also to be noted that the process of the invention has no similarity with over grafting, because said over grafting is not used for the reproduction or multiplication of individuals. Said known technique is used to change the variety of a certain plant or a certain tree or shrub or to regenerate it following pest attacks; what is more, over grafting is not multiple.

The invention also encompasses the products obtained from the various steps of the process.

Variations can be carried out by those skilled in the art to the disclosed embodiment of the present invention: nevertheless these variations have to be considered within the scope of the same invention.

I claim:

1. A process for the multiplication of plant varieties of comprising the following operations: (a) grafting of the variety to be reproduced on a tendril of a rooted mother plant at various levels and leaving the mother plant for time sufficient for the grafting to join to the rooted mother plant; (b) cutting said tendril grafted according to operation (a) from said rooted mother plant above and below said grafting levels to produce cuttings; and (c) rooting said cuttings obtained from operation (b).

2. The process according to claim 1, characterized by the fact that said grafting is carried out when the rootstock is tender and strongly in sap (red thorns).

3. The process according to claim 1, wherein said operation (a) is carried out on said mother plant three times per year.

4. The process according to claim 1, wherein said rooting is carried out in phytocells, rock wool cubes, or automatically operated containers.

5. The process according to claim 1, comprising waiting, after said grafting, for twenty-one days up to several months before carrying out said operation of production of cuttings.

6. The process according to claim 1, comprising, after said operation of production of cuttings waiting up to several months preserving the cuttings already grafted at a temperature near 0° C. without waxing before said rooting.

7. The process according to claim 1, wherein said cuttings are 10–12 cm long.

8. The product according to claim 1, characterized by the fact that grafted cuttings are dematerialized, and very strong and suitable for long distance transport.

9. The process according to claim 1, wherein said rooting operation is carried out at densities of implantation in containers elevated from the soil under glass of from 200 up to 500 plants/m$^2$.

10. Vegetal product obtained through the first operation of the process according to claim 1.

11. Vegetal product obtained through the second operation of the process as claimed in claim 1.

12. Vegetal product as obtained through the third operation of the process according to claim 1.

* * * * *